US006788959B2

(12) United States Patent
Jokinen et al.

(10) Patent No.: US 6,788,959 B2
(45) Date of Patent: Sep. 7, 2004

(54) METHOD AND APPARATUS FOR TRANSMITTING AND RECEIVING DYNAMIC CONFIGURATION PARAMETERS IN A THIRD GENERATION CELLULAR TELEPHONE NETWORK

(75) Inventors: Harri Jokinen, Hiisi (FI); Sari Korpela, Kauniainen (FI); Jussi Numminen, Turku (FI); Antti Toskala, Espoo (FI)

(73) Assignee: Nokia Corporation, Espoo (FI)

( * ) Notice: Subject to any disclaimer, the term of this patent is extended or adjusted under 35 U.S.C. 154(b) by 336 days.

(21) Appl. No.: 10/004,529

(22) Filed: Oct. 23, 2001

(65) Prior Publication Data

US 2002/0128035 A1 Sep. 12, 2002

Related U.S. Application Data

(60) Provisional application No. 60/244,356, filed on Oct. 30, 2000.

(51) Int. Cl.[7] .................................................. H04Q 7/20
(52) U.S. Cl. .................. 455/552.1; 455/436; 455/432.1; 455/561
(58) Field of Search ............................. 455/552.1, 436, 455/437, 438, 439, 432.1, 435.1, 435.2, 435.3, 561

(56) References Cited

U.S. PATENT DOCUMENTS

| 5,214,687 A | 5/1993 | Känsäkoski et al. ........ 455/425 |
| 6,393,286 B1 * | 5/2002 | Svensson ............. 455/552.1 X |
| 6,567,666 B2 * | 5/2003 | Czaja et al. ............ 455/436 X |

FOREIGN PATENT DOCUMENTS

WO   WO 96/19088   6/1996

OTHER PUBLICATIONS

3G TS 25.211 V3.1.1 (Dec. 1999); 3rd Generation Partnership Project; Technical Specification Group Radio Access Network; Physical channels and mapping of transport channels onto physical channels (FDD); published on the Internet, Dec. 1999.

3GPP TS 25.302 V3.6.0 (Sep. 2000); 3rd Generation Partnership Project; Technical Specification Group Radio Access Network; Services provided by the physical layer (Release 1999), Section 7. Published Sep. 2000 on the Internet.

Draft ETSI EN 300 911 V7.4.0 (Apr. 2000); Digital cellular telecommunications system (Phase 2+); Radio subsystem link control; (GSM 05.08 version 7.4.0 Release 1998); Sections 1–6 only, plus annexes.

"Preconfigurations for Release '99 GSM to UMTS handovers"; Vodafone Group plc, Nortel Networks, Beijing, China, Oct. 9–13, 2000.

(List continued on next page.)

Primary Examiner—Nay Maung
Assistant Examiner—Philip J. Sobutka
(74) Attorney, Agent, or Firm—Ware, Fressola, Van Der Sluys & Adolphson LLP

(57) ABSTRACT

A method for a mobile station and a base station to which the mobile is being handed over, and corresponding apparatuses for use by the mobile and the base station. The method for use by the mobile station is for determining whether dynamic configurations are in use by the base station to which the mobile is being handed over, and the method for use by the base station is for determining whether to use a dynamic configuration (if the base station uses dynamic configurations) or to switch to a static preconfiguration in communicating with the mobile. The base station to which the mobile is being handed over is of one wireless communication system (such as the UTRA wireless communication system) and the base station doing the handing over is of another type (such as GSM). Both base stations are assumed to broadcast control signals on a respective broadcast control channel.

22 Claims, 6 Drawing Sheets

OTHER PUBLICATIONS

*Preconfigurations for Release '99 GSM to UMTS handovers*, 3GPP TSG RAN WG2 meeting #16, Vodafone Group plc, Nortel Networks, Beijing, China, Oct. 9–13, 2000.

3GPP TS 25.331 version 3.4.1 Release 1999, ETSI TS 125 331 V3.4.1 (Sep. 2000); Section 8.3.5 Hard Handover, Sec. 9 Protocol States; Section 10.3.5, Section 14.13.2.

Universal Mobile Telecommunications System (UMTS); Physical Channels and mapping of transport channels onto physical channels (FDD) (3GPP TS 25.211 version 3.4.0 Release 1999); ETSI TS 125 211 V3.4.0 (Sep. 2000).

Universal Mobile Telecommunications System (UMTS); Services provided by the Physical Layer (3GPP TS 25.302 version 3.6.0 Release 1999); ETSI TS 125 302 V3.6.0 (Sep. 2000).

* cited by examiner

METHOD AND APPARATUS FOR TRANSMITTING AND RECEIVING DYNAMIC CONFIGURATION PARAMETERS IN A THIRD GENERATION CELLULAR TELEPHONE NETWORK

This application claims priority to a provisional application filed on Oct. 30, 2000, having Ser. No. 60/244,356.

FIELD OF THE INVENTION

The present invention relates to the field of cellular telephony, and more particularly to the transmission of information from a cellular network to a mobile station concerning handover between cells using different radio access technologies, such as from a cell using a radio access technology according to the Global System for Mobile communications (GSM) to a cell using radio access technology according to the Universal Mobile Telephone System (UMTS) Terrestrial Radio Access Network (UTRAN).

BACKGROUND OF THE INVENTION

In a cellular network including different cellular systems, such as GSM and UMTS, which uses so-called wideband code division multiple access (WCDMA) and for which access is provided by UTRAN, to make a GSM to UTRAN handover/cell re-selection for a mobile station fast enough, i.e. to make a suitably fast handover from GSM, the current radio access technology (RAT), to UTRAN, the target RAT, it is necessary to transfer various items of information including so-called channel preconfiguration parameters from the target cellular network to the mobile station. For what are called hardcoded or static preconfigurations, standards specify the preconfiguration parameters, i.e. standards provide a certain number of sets of values of the preconfiguration parameters, each set of values defining a configuration. Examples of preconfiguration parameters are parameters indicating transport block size, transport block set size, spreading factor, CRC, and TTI (transmission time interval) value. Because the static preconfiguration parameters are specified in the standards, a mobile station can be expected to know the parameters (i.e. their values) for each static preconfiguration, usually maintaining the static configurations in memory. In addition to static preconfigurations, however, there are what are called dynamic configurations. These are usually information about the operation of the target RAT in addition to what is provided in any of the static preconfigurations. However, a dynamic configuration can also be complete in and of itself, i.e. it can specify all of the configuration parameters of the target RAT by itself, instead of supplementing the information provided by a static preconfiguration, and so by itself completely specify the configuration of the target RAT.

Unlike for static preconfigurations, the sets of preconfiguration parameters making up a dynamic configuration (whether it supplements a static preconfiguration or is intended to be complete by itself) must be provided to the mobile station dynamically, i.e. at or near the time of handover of the mobile station from GSM to UTRAN.

Section 13.7 of TS25.331 v.3.7.0, entitled *Parameter Values for Default Radio Configurations*, defines (static or hardcoded) preconfigurations, referring to them as default configurations. In section 13.7, the required parameter values are specified for each (hardcoded) preconfiguration. The UE maintains these (hardcoded) preconfigurations in memory.

System Information Block (SIB) type 16 defines dynamic configurations, which are referred to as predefined configurations in section 13.7 of TS25.331. SIB type 16 contains radio bearer, transport channel, and physical channel parameters to be held in memory by the UE. System information is specified to contain a preconfiguration identity and a value tag to identify a certain dynamic configuration as well as updates to dynamic configurations, if needed.

WCDMA is the most widely adopted air interface for so-called third generation wireless communication systems, where GSM is the corresponding interface for so-called second generation (i.e. digital) wireless communication systems. (First generation systems are analog.) In the context of the 3rd Generation Partnership Project (a joint standardization project of the standardization bodies from Europe, Japan, Korea, China and the United States of America), WCDMA is referred to as UTRA (Universal Terrestrial Radio Access), and can be either WCDMA FDD (frequency division duplex) or WCDMA TDD (time division duplex).

In UTRA the data generated at higher layers is carried over the air interface through transport channels, which are mapped to different physical channels in the physical layer. Two types of transport channels exist: dedicated channels (each identified by a certain code on a certain frequency and so reserved for a single user) and common channels (a resource divided between all or a group of users in a cell). There are a number (currently six) of different common transport channel types defined for UTRA, one of which is the so-called broadcast channel (BCH), which is used to transmit information specific to the UTRA network for a given cell. Associated with the BCH (a physical transport channel) is a logical channel, referred to as the broadcast channel (logical channel) and designated as BCCH. For clarity, the corresponding transport channel, designated as BCH, is referred to as the broadcast channel (transport channel).

The Primary Common Control Physical Channel (Primary CCPCH) is the physical channel carrying the Broadcast Channel (BCH). It needs to be demodulated by all the mobile stations in the system. As a result, the parameters with respect to (for example) the channel coding and spreading code contain no flexibility, as they need to be known by all terminals made since the publication of what are called the Release-99 specifications. The contents of the signaling messages have room for flexibility as long as the new message structures are such that they do not cause unwanted or unpredictable behavior in the mobile stations deployed in the network.

The logical channels are mapped to the physical channels in what is called the media access control (MAC) layer. A set of logical channel types is defined for the different kinds of data transfer services offered by the MAC layer. Each logical channel type is defined by the type of information transferred. There are two general categories: logical control channels, used to transfer control information, and logical traffic channels, used to transfer user information. The BCCH is a logical downlink (from base station to mobile station) channel used for broadcasting system control information. The BCCH is mapped to (connected to) the BCH (physical channel) in the MAC layer. (It may also be mapped to what is called the FACH, i.e. the forward access (physical) channel.)

It should be noted that the terms UMTS BCCH and UMTS BCH represent the same channel in UMTS. The term BCCH is used to point to the logical channel, while the term BCH is used to point to the actual transport channel being carried on the Primary CCPCH as described in 3 *GPP TS 25.211, v. 3.4.0*, sections/chapters 4–6.

GSM BCCH capacity is limited, and is not a suitable means for transferring additional (dynamic) preconfiguration parameters to a mobile station. However the transfer might be done, it is advantageous to keep the mobile station power consumption as low as possible. Therefore, when dynamic configurations are transmitted on the UTRA BCCH, it is necessary for example that these dynamic configurations be repeated in the system information of the UTRA BCCH often enough so that the UE need not continue to decode the UTRA BCCH for too long a time. In other words, the UE should not have to wait too long for the dynamic configurations to appear again. On the other hand, the UE should not attempt to decode the UTRA BCCH when UTRAN quality (coverage) is poor or if dynamic configurations are not used in the network. Unnecessary decoding of UTRA BCCH increases the idle mode activity of the UE and so increases power consumption.

The standard set out in the specification entitled, 3 *GPP* 25.302, *v.* 3.60, chapter 7, describes certain channel transport format combinations (TFCs) (which are supported by at least some mobile stations). In addition, there is a proposal from Vodafone (R2-002015) in which additional (dynamic) preconfiguration parameters are transferred from a cellular network (i.e. a base station) to a mobile station, but the proposal does not indicate how the transfer could be done fast enough (and also reliably enough) to provide for handover/cell reselection with acceptably low power consumption by the mobile station. Moreover, the prior art does not teach how to avoid so-called ping-ponging (handover/cell reselection back and forth from one system to another) in inter-RAT (Radio Access Technologies) cell reselection, i.e. in selecting between for example GSM and WCDMA (UTRA).

What is needed is a method for quickly and reliably communicating to a mobile station in being handed over from a cell operating under GSM to a cell operating under UTRA (WCDMA) any dynamic configuration information needed by the mobile station for operation in the cell operating under UTRA.

SUMMARY OF THE INVENTION

Accordingly, the present invention provides a method for a mobile station and a base station to which the mobile is being handed over, and corresponding apparatuses for use by the mobile and the base station. The method for use by the mobile station is for determining whether dynamic configurations are in use by the base station to which the mobile is being handed over, the base station to which the mobile is being handed over being of a first wireless communication system (such as the universal mobile telephone system terrestrial radio access (UTRA)) and the base station doing the handing over being of a different wireless communication system (such as the global system for mobile communications (GSM) wireless communication system). Both base stations are assumed to broadcast control signals on a respective broadcast control channel. The method for use by the mobile station includes: a) a step of determining whether the signal level of the control signal broadcast by the different wireless communication system meets a predetermined criterion for intersystem reselection; b) a step of receiving the control signal broadcast by the first wireless communication system; c) a step of performing an error check of the received control signal broadcast by the first wireless communication system; and d) a step of decoding the control signal broadcast by the first wireless communication system and in so doing, reading whatever dynamic configurations are being broadcast by the base station of the first wireless communication system; wherein, if the error check fails, the mobile station performs a step of waiting a predetermined time interval, and then repeats the method beginning with the step of receiving the control signal from the first wireless communication system.

In a further aspect of the invention, the mobile also performs a step of decoding the control signal broadcast by the different wireless communication system and reading a flag bit indicating whether or not the base station of the first wireless communication system is using dynamic configurations, and then only if the flag bit indicates that the base station of the first wireless communication system is using dynamic configurations does the mobile station receive and decode the control signal broadcast by the first wireless communication system carry out the aforementioned steps (a)–(d).

The corresponding method for use by the base station of the first wireless communication system in determining whether or not to use dynamic configurations in communicating with the mobile station being handed over by the base station of a different wireless communication system, assumes that the mobile station communicates with the base station of the first wireless communication according to a protocol in which a transport format combination indicator (TFCI) is used (at least by the mobile), and includes: a) a step of transmitting to and receiving from the mobile station with using dynamic configuration parameters; b) a step of examining the uplink TFCI to determine whether the TFCI points to a dynamic configuration; and c) a step of continuing to transmit to and receive from the mobile station with the dynamic configuration pointed to by the uplink TFCI, if the uplink TFCI points to a dynamic configuration, and otherwise a step of transmitting to and receiving from the mobile station using a static preconfiguration.

From another perspective, the invention includes a method and corresponding apparatus for use by a mobile station including the steps of: a) receiving at a mobile station a broadcast control signal issuing from a base station to which the mobile station is being handed over by another base station; and b) based on an error check of the broadcast control signal, either reading any dynamic configuration indicated by the broadcast control signal or waiting until a predetermined time to repeat the aforementioned step (a). In some applications, the steps (a)–(b) are performed only if a flag bit received from the base station handing over the mobile station indicates that dynamic configurations are in use at the base station to which the mobile station is being handed over.

From this other perspective the invention also includes a corresponding method (and corresponding apparatus) for use by a base station, including the steps of: a) receiving at the base station a signal from a mobile station indicating a dynamic configuration or a state preconfiguration in use by the mobile station; and b) using dynamic configuration parameters or static preconfiguration parameters in said base station depending on said signal received from said mobile station.

The present invention is an improvement over what is provided by the prior art in that with the present invention it is possible to avoid complex double cell reselection criteria based on some prioritization depending on whether dynamic configuration parameters are available or not.

In a concept proposed by Vodafone, a mobile station should give priority to GSM over UTRA if the mobile station has not been able to receive dynamic configurations even though the UTRA network is transmitting them on the UTRA BCCH. On the other hand, UTRA should be given priority over GSM if the dynamic configurations are not obtained by the mobile station. If this kind of prioritization is used in cell reselection, it should be taken into account in the cell reselection criteria of both GSM and UTRA in order to avoid having a mobile station change back and forth between radio access technologies. If prioritization is for example only defined in the cell reselection criteria of the GSM specification, it might happen that the prioritization rules in cell reselection criteria tends to push a mobile station toward using UTRA. However, since such complex prioritization cell reselection rules are not defined in the UTRA specification, a mobile station would immediately come back to GSM and then again to UTRA and so on. Instead of having such different kinds of prioritization rules in the cell re-selection criteria, the invention defines a mechanism to recover from a situation where the UTRA network uses dynamic configurations (transmitting them on UTRA BCCH as well), but the mobile station has not been able to receive them from UTRA BCCH due to poor UTRA signal quality or because the mobile station has been in GSM dedicated mode and does not have a dual receiver for receiving both GSM and UTRA data simultaneously.

Complex cell re-selection criteria (rules) both in GSM and in UTRA are required to make the concept work properly and to avoid ping-ponging between two radio access technologies (i.e. in this case between GSM and UTRA).

In addition, mobile station power consumption can be decreased using the invention, since according to the invention, a UE periodically looks for dynamic configurations only if the signal level of the measured GSM signal is either above or below a predetermined threshold (depending on the implementation) based on the measurement criterion for cell reselection defined between UMTS and GSM. Thus, the network operator can control terminal power by setting the threshold so that the UE need not attempt to read dynamic configurations when the signal quality of the UTRA network is not adequate.

Finally, the network can choose to use either dynamic configurations or (hardcoded, i.e. static) preconfigurations, depending on what sort of configurations the network supports and what services the operator would like to provide.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
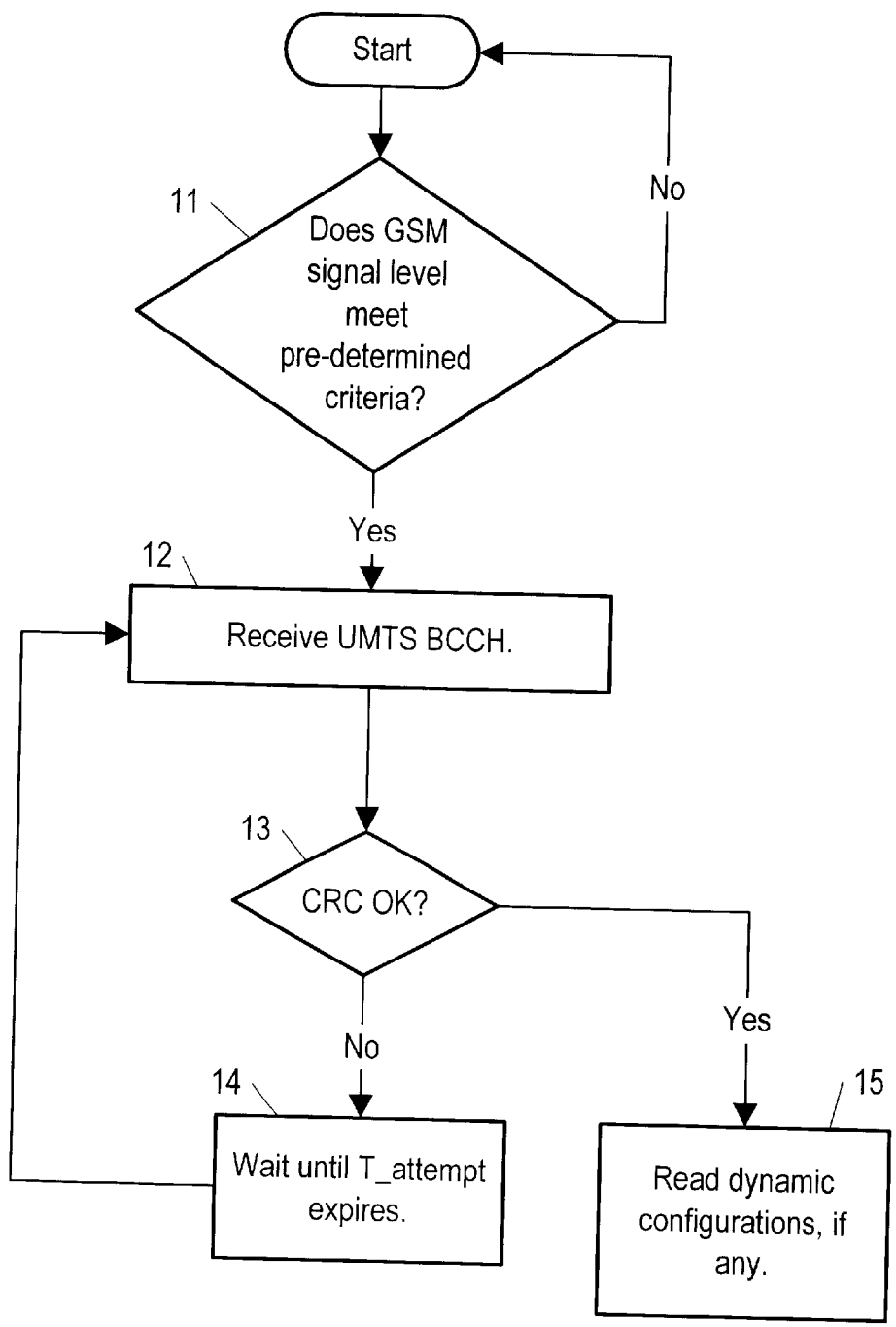
FIG. 1 is a flow chart for a first method, according to the invention, for having a mobile station determine whether dynamic configurations are in use by a UTRA cell to which the mobile station is being handed over by a GSM cell.

The present invention is a method and protocol for use in case of a handover of a mobile station from a cell using GSM to a cell using UTRA; it provides for having the mobile station acquire dynamic configuration parameters, if practicable, to be used in operation in the UTRA cell. Dynamic configuration parameters, as opposed to static preconfiguration parameters (organized into sets, each set describing a particular configuration, the sets specified by a standard and so known in advance to any mobile able to operate in a UTRA cell), are not a priori known to the mobile station and so must be communicated to the mobile station. The dynamic configuration parameters may be in addition to the static configuration parameters to fully specify a configuration, or may be used by themselves. Examples of preconfiguration parameters include parameters indicating transport block size, transport block set size, spreading factor, CRC in use, and TTI (transmission time interval) value. The preconfiguration parameter values are provided to a mobile station according to one of three methods, as described below.

Some mobile stations are equipped to read dynamic configuration parameters and some are not, and the base station to which a mobile station is being handed over must determine which is the case. The invention includes methods by which a mobile station undergoing a GSM to UTRA handover is to obtain dynamic configurations for use in the UTRA cell (either a set of parameters and their values or sets of values of parameters and their values along with an indicator of which set to use) from the base station (node B) to which the mobile station is being handed over (at least in the case that the mobile station is equipped to read dynamic configuration parameters), and also a method, in case of a GSM to UTRA handover, setting out steps to be followed by the UTRA base station (a so-called node B) by which to determine whether the mobile station has read its dynamic configuration parameters or not (the mobile station not having done so because either it is not equipped to do so, or signal conditions are too poor for it to do so).

For example, a network could provide a cell operating according to GSM and another cell according to UTRA, and the base station (node B) for the cell operating according to UTRA could operate according to parameters indicated by a predefined static configuration (i.e. a preconfiguration) and, in addition, according to parameters not predetermined, but instead defined dynamically. To indicate to mobile phones being handed over to it which of the predefined (static) preconfigurations to use (all of which are assumed for purposes of this example to be maintained in a memory device of the mobile station), the UTRA base station could use a default channel preconfiguration indicator having eight possible values (i.e. eight values for the single (hardcoded) preconfiguration indicator, each of the eight values indicating a different preconfiguration as defined by standards). Then for the mobile station being handed over from the GSM channel to the UTRA channel (either a hard handover, a soft handover, or a softer handover), the network (via either the GSM base station or the UTRA base station) must inform the mobile station of the value of the preconfiguration indicator. To do so would require transmitting to the mobile station three bits, which would be done, according to the invention, using a dedicated handover command message (more specifically, a handover to UTRAN command message). In addition, the network could have defined four additional, dynamic configuration parameter values, which, according to the invention, are also signaled to the mobile station on UMTS BCCH (along with the three-bit indicator for the static preconfiguration parameters). In this example, the network (and more particularly, the subject node B) broadcasts only the specific additional dynamic configuration parameters it uses, not sets of dynamic configuration parameters, and so the mobile station need not acquire sets of dynamic configuration parameters and also an indicator for indicating which dynamic configuration set to use, but instead only the additional configuration parameters used by the node B.

Typically, a mobile maintains a copy of all (hardcoded) preconfigurations in a memory device, so that when a handover from GSM to UTRAN command message is issued by the GSM network, the GSM network need not send to the mobile station actual parameters used to initiate a dedicated channel connection in UTRAN. Instead, similar to what is described in the above example, the GSM network can refer to a certain specific (static) preconfiguration using a certain parameter value (i.e. a preconfiguration indicator). (A GSM to UTRAN handover command is sent via the GSM network to the mobile phone. However, the Handover to UTRAN message is first sent from the UTRAN network to the GSM network, and then on to the mobile phone.) On the other hand, dynamic configurations (sets of parameters), or alternatively, only dynamic configuration parameters used by the cell to which the mobile is being handed over, are broadcast on the UTRAN BCCH channel, and the dynamic configuration parameters may of course differ from network to network, i.e. from one public land mobile network (PLMN) to another (but are the same for different node Bs within a PLMN. Hence, UTRAN must broadcast the actual preconfiguration parameters for each dynamic configuration (i.e. for each different set of dynamic configuration parameters) along with an indicator, or, alternatively, the actual dynamic configuration parameters it uses (their identity and values). Obviously, in case of a UTRAN cell broadcasting set of dynamic configuration parameters and an indicator of which set is in use, (hardcoded) preconfiguration indicators and dynamic configuration indicators must be distinguishable.

There can be several dynamic configurations broadcast on the UTRAN BCCH, each typically represents different services and different data rates. Each dynamic configuration (as well as each preconfiguration) includes several parameters relating to both for downlink and uplink. When handover is commanded (by a GSM base station, only one preconfiguration is referred to in the command. The preconfiguration referred to defines all needed parameters both for uplink and downlink.

The invention includes two parts: firstly, two alternative ways by which a mobile station learns whether or not a UTRAN cell uses dynamic configurations, and if so, a way to receive the information specifying the dynamic configuration in use; and secondly, a protocol to be followed by a UTRAN cell using dynamic configurations in communicating with a mobile station, including how to communicate with the mobile whether or not the mobile station is prepared to use the dynamic configurations.

A first embodiment of a method by which a mobile station learns whether dynamic configuration parameters are in use by a UTRAN cell to which it is being handed over Referring now to FIG. 1, in a first embodiment of a method according to the invention for having a mobile station determine whether or not a UTRAN cell is using dynamic configuration parameters, in a decision step 11 the mobile station determines whether the GSM signal level meets predefined (predetermined) criteria, i.e. whether the signal level (or signal quality) of the measured GSM signal, as provided for example by the received signal strength indicator (RSSI), is above (or below) a predetermined threshold (depending on the implementation, as mentioned above) based on the measurement criterion for cell reselection defined between UMTS and GSM. (If the received signal strength is not adequate, i.e. when the predefined criteria are not met, the terminal does not need to even try to read dynamic configurations, since attempting to do so would be futile. The threshold used for inter-system reselection is transmitted on a downlink channel, such as the broadcast channel, available to the mobile station, and in particular the GSM BCCH when the handover/cell reselection is from a GSM cell to a UTRA cell.) If the GSM signal level meets the predefined criteria, then, in a next step 12, in order to determine whether dynamic configurations are in use, the mobile station periodically receives and attempts to decode the UMTS BCCH. After receiving the UMTS BCCH, in a next decision step 13, the mobile station decides whether or not the received signal passes a CRC check. If so, then in a next step 15, the mobile station reads dynamic configurations from the UMTS BCCH, if they are present, and so determines whether or not the UTRA cell uses dynamic configurations, and if so, what they are. If the received GSM UMTS signal does not pass the CRC check, then in a step 14, the mobile station waits for an interval T_attempt between receiving the UMTS BCCH to elapse, and then again tries the step 12 of receiving the UMTS BCCH. The time interval T_attempt is used in order to avoid having the mobile station attempt to decode the UMTS BCCH continuously. (Such attempts would interfere with paging reception in GSM, and they would also result in increased IDLE mode activity.)

In such an embodiment, the receiving and decoding of the UMTS BCCH (performed before the actual handover from GSM to UTRA), to obtain the dynamic configuration parameters in use by the node B (or, instead, sets of dynamic configuration parameters and an indicator of which set is in use) is performed while the mobile is in IDLE mode (between paging receptions).

Figure 2:
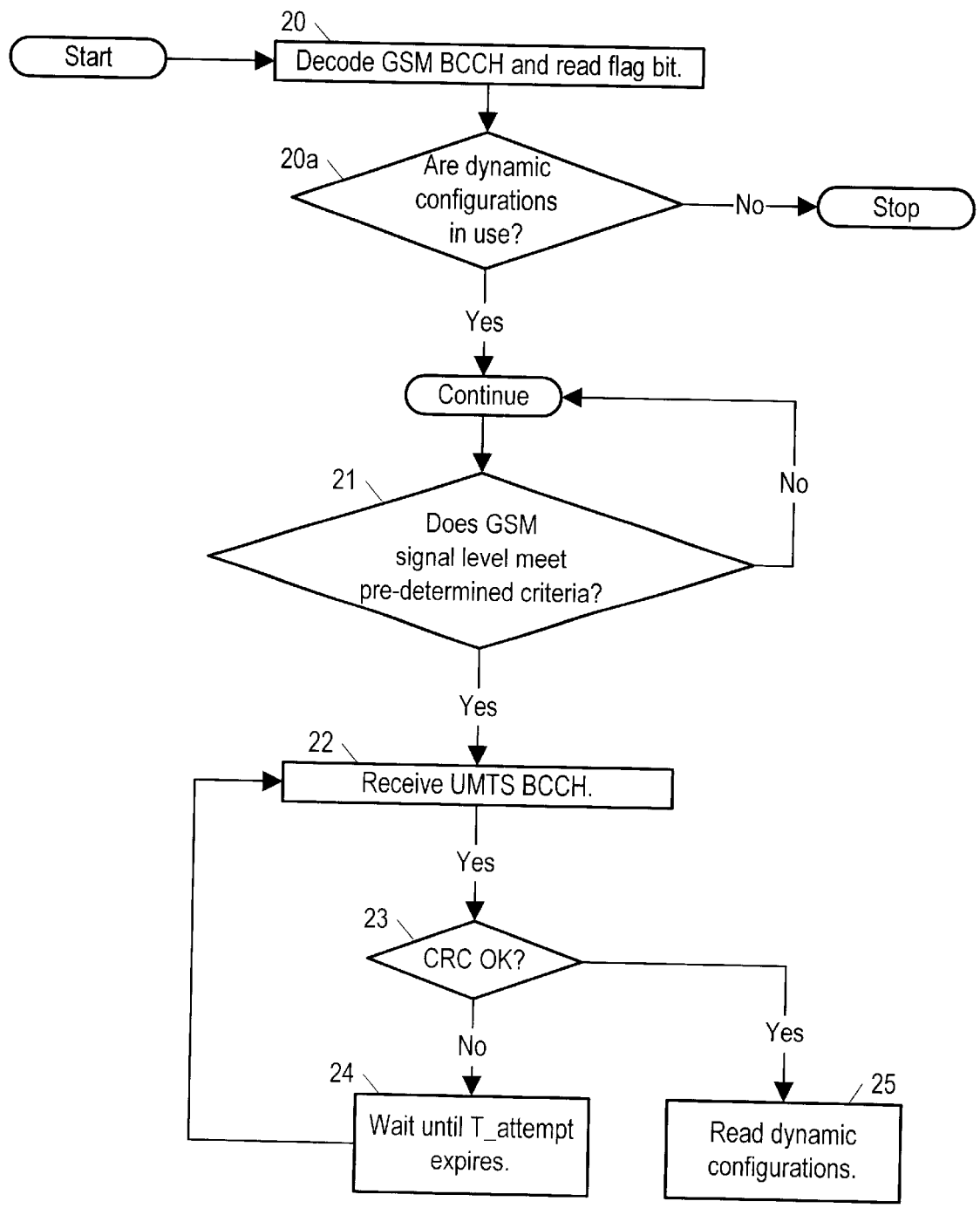
FIG. 2 is a flow chart for a second method (a second method that is essentially the first method with an additional, prefatory step), according to the invention, for having a mobile station determine whether dynamic configurations are in use by a UTRA cell to which the mobile station is being handed over by a GSM cell.

A second embodiment of a method by which a mobile station learns whether dynamic configuration parameters are in use by a UTRAN cell to which it is being handed over Referring now to FIG. 2, in a second embodiment of the method of the invention for having a mobile station determine whether dynamic configuration parameters are in use by the UTRA node B to which the mobile is being handed over by a GSM base station, the GSM base station transmits a flag bit over the GSM BCCH indicating whether or not the node B uses dynamic configurations and in a first step 20 (by the mobile), the mobile station receives the GSM BCCH and decodes it so as to read the flag bit. In a next step 20a, the mobile station determines whether the flag bit indicates that dynamic configurations are in use by the UTRA cell, and if the flag bit indicates that dynamic configurations are in use, then the mobile station obtains the dynamic configurations as in the above-described method relying on using an interval T_attempt between reading the GSM BCCH. Thus, in a decision step 21 the mobile station determines whether the GSM signal level meets predefined criteria, i.e. whether the signal level (or signal quality) of the measured GSM signal is above (or below) a predetermined threshold (depending on the implementation, as mentioned above) based on the measurement criterion for cell reselection defined between UMTS and GSM. If the GSM signal level meets the predefined criteria, then, in a next step 22, the mobile station periodically receives and attempts to decode the UMTS BCCH. After receiving the UMTS BCCH, in a next decision step 23, the mobile station decides whether or not the received signal passes a CRC check. If so, then in a next step 25, the mobile station reads the dynamic configurations from the UMTS BCCH (which are known to be present because the flag bit has so indicated), and so learns what dynamic configurations are in use by the UTRA cell. If the received UMTS BCCH signal does not pass the CRC check, then in a step 24, the mobile station waits for an interval T_attempt between receiving the UMTS BCCH to elapse, and then again tries the step 22 of receiving the UMTS BCCH.

As in the method illustrated in FIG. 1, which does not rely on a flag bit, the receiving and decoding of the UMTS BCCH (performed before the actual handover from GSM to UTRA) performed in the method illustrated in FIG. 2, is performed while the mobile is in IDLE mode (between paging receptions). Note that in the method illustrated in FIG. 2, the mobile station does not have to decode the UMTS BCCH transmission if the flag bit provided by the GSM base station indicates that dynamic configurations are not in use by the node B.

Figure 3:
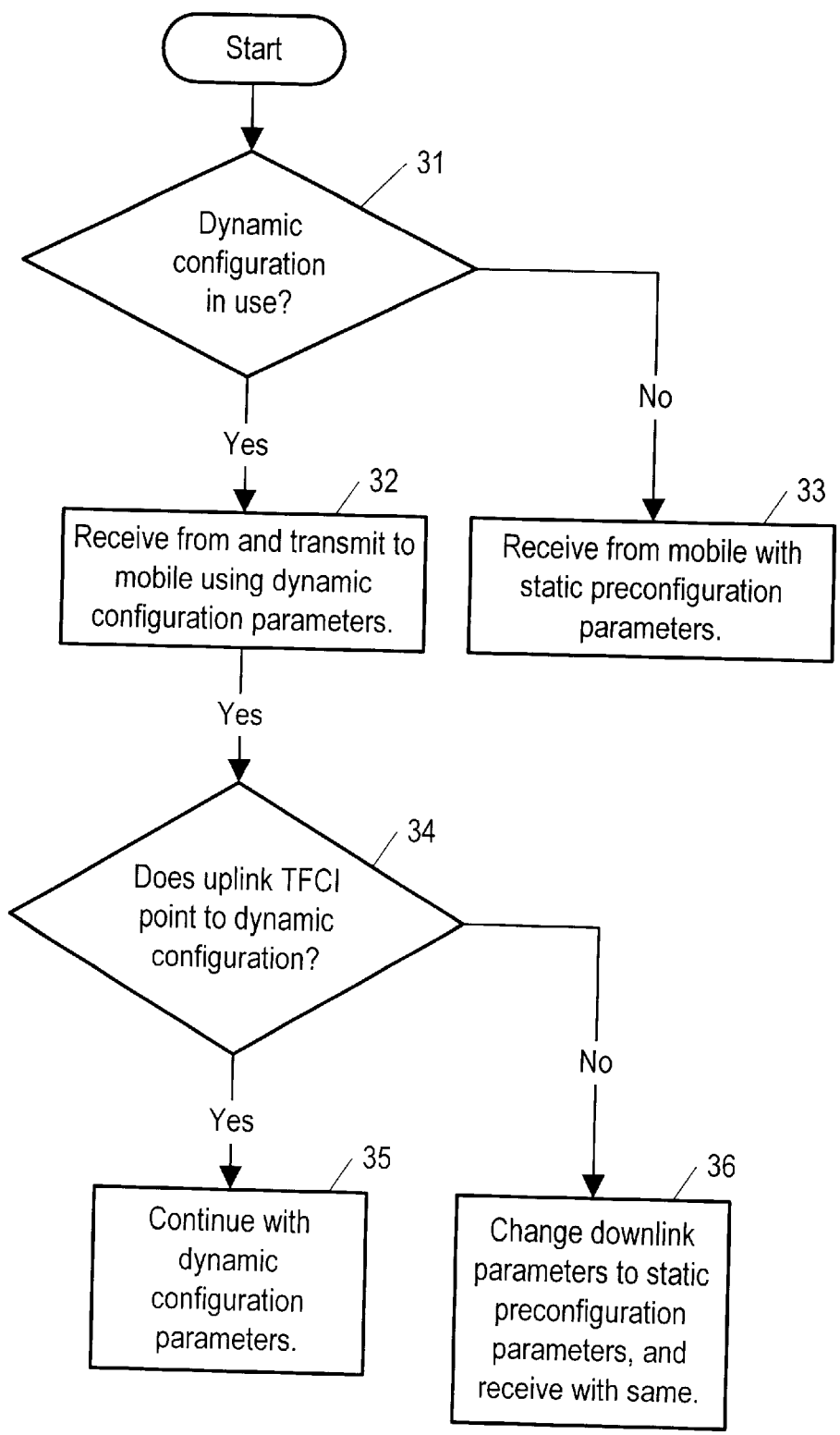
FIG. 3 is a flow chart for method, according to the invention, for having a UTRA node B determine whether or not to use dynamic configuration parameters or (hardcoded) preconfiguration parameters in communicating with a mobile station undergoing a handover from a GSM cell.

A method for having a UTRA base station (i.e. a node B) determine whether or not to use dynamic configuration parameters in communicating with a mobile undergoing a handover from a GSM base station Referring now to FIG. 3, a method to be followed by a UTRA node B, that from time to time uses one or another dynamic configuration, in determining whether or not to use one or another such dynamic configuration in communicating with a mobile station being handed over to it from a GSM cell is shown as beginning with a first decision step 31 from which the node B proceeds to one of two possible courses 32 33 depending on whether the node B is currently using one or another of the dynamic configuration. The method therefore relies on information about the dynamic configurations having been broadcast via the UMTS BCCH. If the node B is currently using dynamic configurations, it must decide whether to use dynamic configurations or (hardcoded) preconfigurations in communicating with the mobile being handed over to it from a GSM cell, based on whether or not the mobile phone can read the dynamic configurations. (As mentioned above, a mobile station might not be able to read dynamic configurations either because the mobile station does not have the capability to do so or because external factors such as factors causing bad reception prevent the mobile station from reading the dynamic configurations.) According to the invention, if the node B is using dynamic configuration parameters, to determine whether the mobile has detected the dynamic configuration parameters, in a decision step 34, the node B examines the uplink transmission to whether a code word in the so-called Transport Format Combination Indicator (TFCI) indicates a dynamic configuration, and depending on the outcome of the determination proceeds in one of two possible courses 35 36.

Such a code word would indicate a particular transport format combination set appropriate for the source data rate, as set out by TS25.212, section 4.2.7 and 4.3, the code words used in connection with a dynamic configuration being different from the code words used in connection with a static preconfiguration.

The DPCCH (Dedicated Physical Control Channel) structure needs to be the same for both the (hardcoded) preconfigurations and the dynamic configurations, and the SF (spreading factor) is fixed to 256 for the uplink in any case. If the node B determines that the uplink TFCI does point to a dynamic configuration, then in a next step 35, the node B continues communication with the mobile station using the dynamic configuration, else, in a next step 36, the node B uses downlink parameters according to a corresponding static preconfiguration (There are only a few different preconfigurations for each different service, e.g. for each different data rate, and therefore the network and the terminal can do one-to-one mapping from a dynamic configuration to a preconfiguration (based on the data rate and spreading factor). So if for downlink, the network has first used a dynamic configuration for data rate C, it then uses the corresponding preconfiguration for the same data rate C.)

The dynamic configuration pointed to by the TFCI need not be (and usually is not) the same dynamic configuration as used by the node B in downlink. Uplink and downlink configurations (preconfigurations or dynamic configurations) often differ; for example, the uplink data rate is often different from the downlink data rate. However, if an uplink TFCI points to a dynamic configuration, the network knows that the mobile has received the dynamic configuration parameters from UTRA BCCH, and so the network can continue using dynamic configurations. It is naturally assumed that the mobile has received all (or at least all relevant) dynamic configuration parameters if the terminal indicates a dynamic configuration in its uplink.

In first communicating with the mobile station (in step 32), before ascertaining whether the mobile station is using the dynamic configuration in use by the node B (as per step 31, the node B should use as a dynamic configuration one for which the parameters (like spreading factor as well as the DPCCH structure) are the same as for the preconfiguration (i.e. there should be a one-to-one mapping between dynamic configurations and preconfigurations, both for the downlink and the uplink), ensuring that communication control parameters such as power control are handled without a problem whether or not the mobile station can read the dynamic configurations). If the network has selected to use a particular dynamic configuration and determines that the mobile station is using the (hardcoded) preconfiguration, the network, according to the invention, is to replace the downlink DPDCH (dedicated physical data channel) part defined for the dynamic configuration with the DPDCH defined for the (hardcoded) preconfiguration. As mentioned above, the determination can be made by examining the set of TFCI code words the mobile station transmits to the node B. If the TFCI code words for the (hardcoded) preconfiguration are detected, then the downlink DPDCH is to be adjusted as described (assuming the DPCCH parameters were the same for both preconfigurations, otherwise the DPCCH parameters need to be adjusted in the same way, i.e. the dynamic configuration DPCCH values must be replaced by the static preconfiguration DPCCH values used by the mobile).

Figure 4:
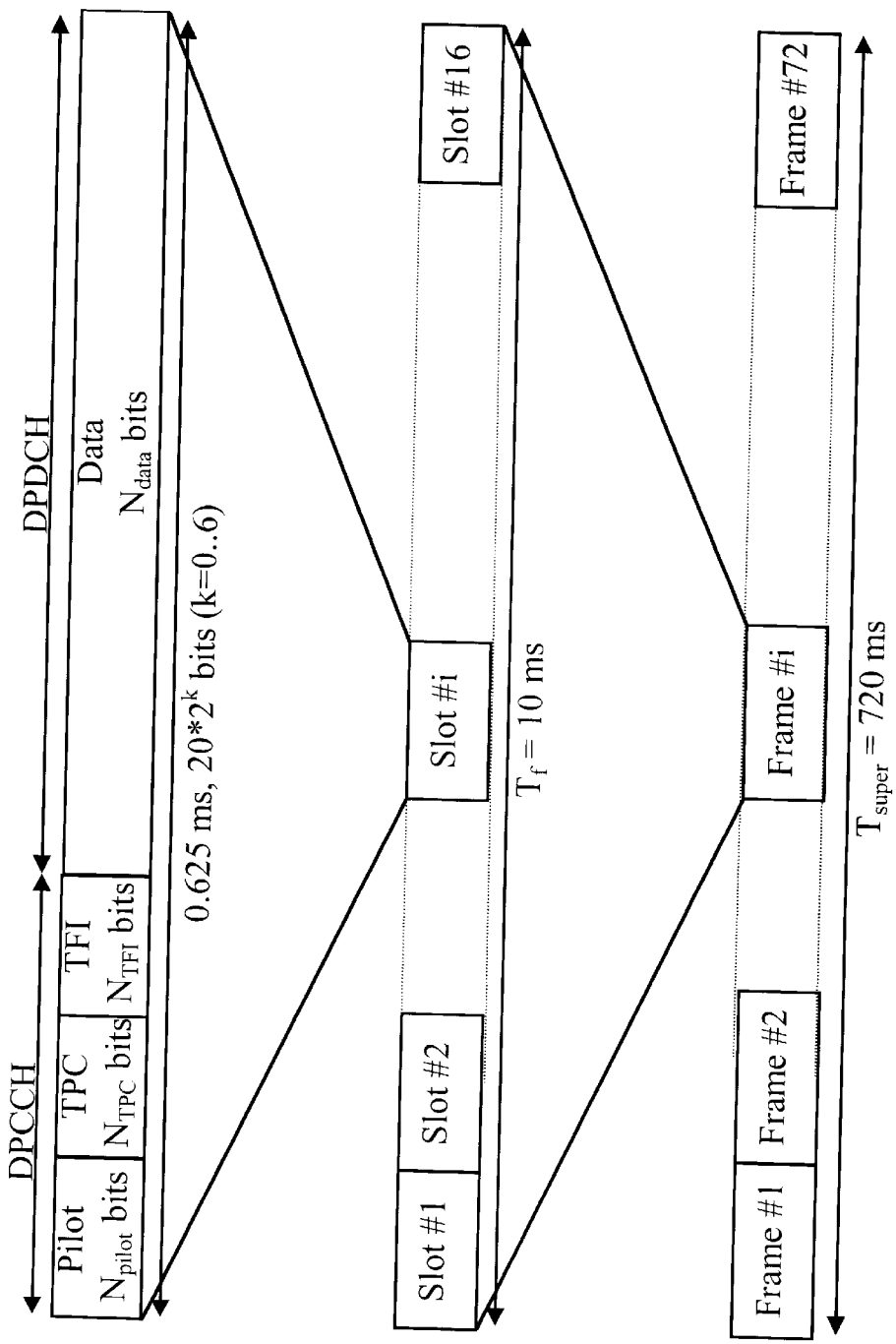
FIG. 4 is a schematic illustrating the structure of a downlink dedicated physical channel (DPCH) radio frame.

Referring now to FIG. 4, the frame structure for a downlink dedicated physical channel (DPCH) radio frame, per TS25.211 v3.5.0, section 5.3.2, is shown as including 15 slots, with each slot consisting of number $N_{data1}$ of bits in the DPDCH, a number $N_{TPC}+N_{TFCI}$ of bits in the DPCCH, where the number $N_{TPC}$ of bits indicates the TPC and the number $N_{TFCI}$ of bits indicates the TFCI, a number $N_{data2}$ of bits also from the DPDCH, and finally, a number $N_{pilot}$ of bits also from the DPCCH. A slot consists of 2560 chips, which correspond to $10 \times 2^k$ bits, where k=0, 1, . . . , 7, depending on the slot format. Some different slot formats are indicated in table 1 below, which is partial reproduction of table 11 of TS25.211 v3.5.0, section 5.3.2.

TABLE 1

Some formats for a DPCH radio frame, from table 11 of TS25.211 v3.5.0, section 5.3.2.

| k value | Slot Format #i | Channel Bit Rate (kbps) | Channel Symbol Rate (ksps) | SF | Bits/ Slot | DPDCH Bits/Slot | | DPCCH Bits/Slot | | | Transmitted slots per radio frame |
|---|---|---|---|---|---|---|---|---|---|---|---|
| | | | | | | $N_{Data1}$ | $N_{Data2}$ | $N_{TPC}$ | $N_{TFCI}$ | $N_{Pilot}$ | $N_{Tr}$ |
| 0 | 0 | 15 | 7.5 | 512 | 10 | 0 | 4 | 2 | 0 | 4 | 15 |
| 0 | 0A | 15 | 7.5 | 512 | 10 | 0 | 4 | 2 | 0 | 4 | 8–14 |
| 1 | 0B | 30 | 15 | 256 | 20 | 0 | 8 | 4 | 0 | 8 | 8–14 |
| 0 | 1 | 15 | 7.5 | 512 | 10 | 0 | 2 | 2 | 2 | 4 | 15 |
| 1 | 1B | 30 | 15 | 256 | 20 | 0 | 4 | 4 | 4 | 8 | 8–14 |
| 1 | 2 | 30 | 15 | 256 | 20 | 2 | 14 | 2 | 0 | 2 | 15 |
| 1 | 2A | 30 | 15 | 256 | 20 | 2 | 14 | 2 | 0 | 2 | 8–14 |
| 2 | 2B | 60 | 30 | 128 | 40 | 4 | 28 | 4 | 0 | 4 | 8–14 |
| 1 | 3 | 30 | 15 | 256 | 20 | 2 | 12 | 2 | 2 | 2 | 15 |
| 1 | 3A | 30 | 15 | 256 | 20 | 2 | 10 | 2 | 4 | 2 | 8–14 |
| 2 | 3B | 60 | 30 | 128 | 40 | 4 | 24 | 4 | 4 | 4 | 8–14 |
| 1 | 4 | 30 | 15 | 256 | 20 | 2 | 12 | 2 | 0 | 4 | 15 |
| 1 | 4A | 30 | 15 | 256 | 20 | 2 | 12 | 2 | 0 | 4 | 8–14 |
| 2 | 4B | 60 | 30 | 128 | 40 | 4 | 24 | 4 | 0 | 8 | 8–14 |

The number $N_{TPC}$ of TPC bits is either 2, 4, or 8, and, as indicated in table 2, which is a reproduction of table 13 of TS25.211 v3.5.0, section 5.3.2, all of the bits are either a 0 or a 1, depending on whether the transmitter power control command is a 0 or a 1 (respectively).

TABLE 2

TPC bit pattern

| TPC Bit Pattern | | | Transmitter power |
|---|---|---|---|
| $N_{TPC} = 2$ | $N_{TPC} = 4$ | $N_{TPC} = 8$ | control command |
| 11 | 1111 | 11111111 | 1 |
| 00 | 0000 | 00000000 | 0 |

Thus, a mobile station can determine whether the transmitter power control is a 1 or a 0 even if the mobile station receives only one of the TPC bits.

In the downlink direction, even if the same spreading factor is used for the dynamic configuration as would be used for the preconfiguration, since there is more than one slot format defined for a given spreading factor (as per Table 11 of TS25.211 v3.5.0, section 5.3.2, reproduced in part above as table 1), the slot format for the dynamic configuration may still differ from what the slot format would be for the corresponding preconfiguration; thus, the DPCCH structure for the dynamic configuration may still differ from what it would be for the corresponding preconfiguration, as e.g. the power control command slot position (in the frame) is always fixed thus and can be detected whenever the spreading factor is known. (The number of pilot symbols can differ from slot format to slot format even if the spreading factors remain the same. However, if the spreading factor remains the same, at least some of the $N_{TPC}$ bits of the power control symbol (indicating the power control command) are always in the same location in a slot and therefore the power control command can always be detected as long as the spreading factor remains the same, since only one TPC bit must be determined to determine the power control command (because all the TPC bits are either one or zero, depending on whether the power control command is a one or a zero) although detecting more than one TPC bit is always preferable for greater reliability. In order to maintain reasonable system performance, it is essential to detect the power control command.) If the number of pilot bits in the DPCCH field for the dynamic configuration and the preconfigurations are not the same, then there is some degradation in the channel estimation process. (For example, the slot format of a dynamic configuration may have eight pilot symbols, and the slot format of a preconfiguration only four pilot symbols. Since these known pilot symbols are used for estimating channel, the difference in the number of pilot symbols causes degradation in the estimation process.)

When the a mobile station is undergoing a handover from GSM to UTRAN, it is already using a particular service and so a particular data rate in communicating via GSM. The service being used should be maintained during handover. Since the mobile station knows its current service and data rate in GSM prior to handover, it can determine which (UTRAN) preconfiguration matches its data rate in GSM. The mobile has to choose both a matching uplink and downlink configuration based on the current uplink and downlink data rates. Once the mobile receives a handover command from the GSM side to switch from GSM to UTRAN, the mobile station knows to use either the (hardcoded) preconfiguration parameters or dynamic configuration parameters because the handover command includes an index pointing either to a dynamic configuration or to the (hardcoded) preconfiguration.

If the mobile station has been able to read the relevant information blocks on the UMTS BCCH prior to receiving the handover command, then it has whatever dynamic configuration parameters it needs, and will use them for the dedicated channel transmission after the handover procedure is complete (including synchronization and so on). If the mobile station has not been able to acquire (read) the dynamic configuration parameters prior to handover, then it automatically uses the (hardcoded) preconfiguration parameters and their values (stored in the memory of the mobile station). Since the uplink and downlink data rates may differ, the mobile station must be sure to use a preconfiguration for which both the uplink and downlink data rates match those it is using in GSM.

Figure 5:
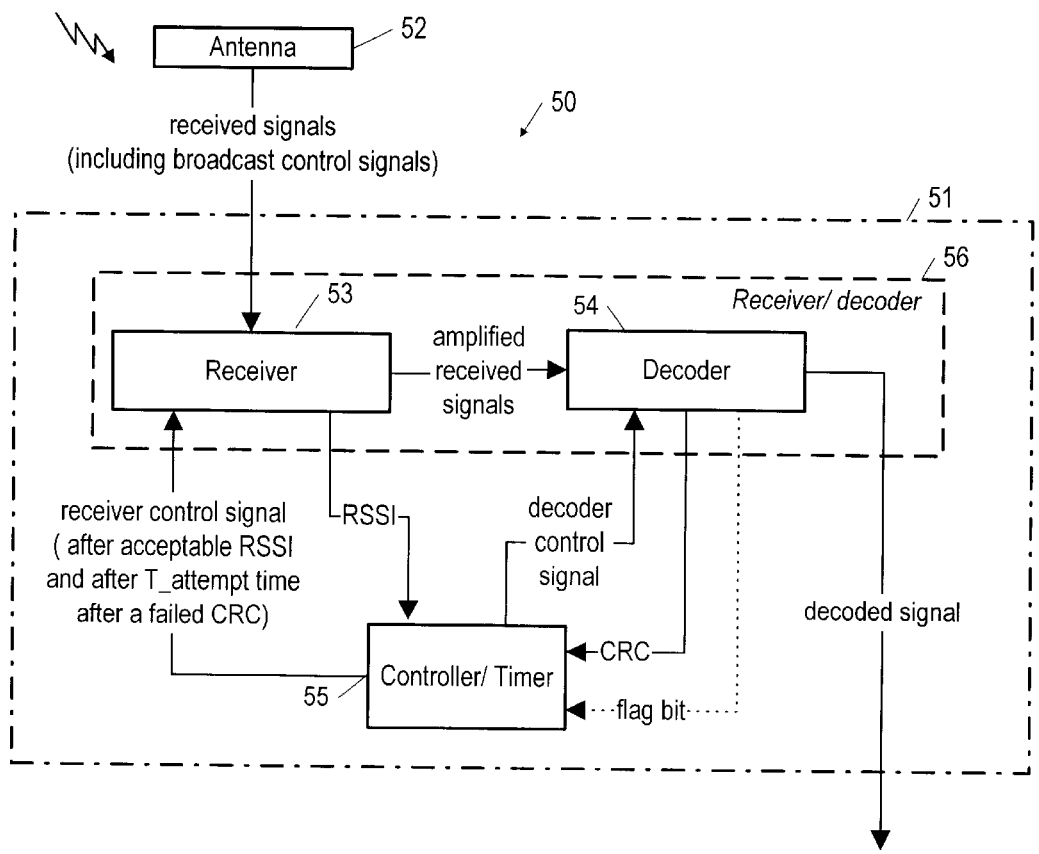
FIG. 5 is a schematic/block diagram of an apparatus (part of a mobile station) according to the invention, for receiving dynamic configuration parameters from a base station according to either of the methods illustrated in FIGS. 1 and 2.

Aspects of a receiver of a mobile station reading dynamic configuration parameters Referring now to FIG. 5, the principal components of a mobile station 50 that are used in executing the method of the invention indicated in FIGS. 1 and 2 are shown; the components that implement the invention are indicated collectively as apparatus 51. The mobile station 50 includes: an antenna 52 for enabling reception of signals, a receiver (RX) module 53 for receiving signals on various channels including broadcast control signals from UMTS and GSM base stations (i.e. signals on the GSM BCCH and on the UMTS BCCH), a decoder 54 for decoding the received signal, and also a controller/timer 55. The signal level (as indicated by for example by the RSSI) is determined from the received signal by the receiver 53, and CRC checks are performed by the decoder 54. (Recall that it is the signal level, as indicated for example by the RSSI, that is used (by the controller/timer 55) to determine whether the GSM signal level meets predetermined criteria for continuing in an attempt to read dynamic configurations.) The CRC checks and the signal level (RSSI) are both provided to the controller/timer module 55, which controls the reception modules so as to receive the preconfigurations as described in the above described different embodiments of the method of the invention illustrated in FIGS. 1 and 2. It is the controller/timer module 55 that executes the method of the invention indicated in FIG. 1. Based on the logic indicated in FIGS. 1 and 2, the controller/timer 55 provides a decoder control signal to the decoder 54 to extract (read) dynamic configurations from the received UMTS BCCH, and (alternatively) a receiver control signal to the receiver 53 to again receive the UMTS BCCH (after a failed CRC check and after the controller/timer waits a period T_attempt since the last failed CRC check). Corresponding to the embodiment indicated in FIG. 2, the decoder 54 provides a flag bit extracted from a received GSM BCCH signal, and the controller/timer uses the flag bit to determine whether dynamic configurations are in use. The allocation of functions indicated in FIG. 5 between the receiver 53 and the decoder 54 is in some respects arbitrary, and the invention is more generally represented in terms of a combined receiver/decoder module 56, as indicated in FIG. 5.

Figure 6:
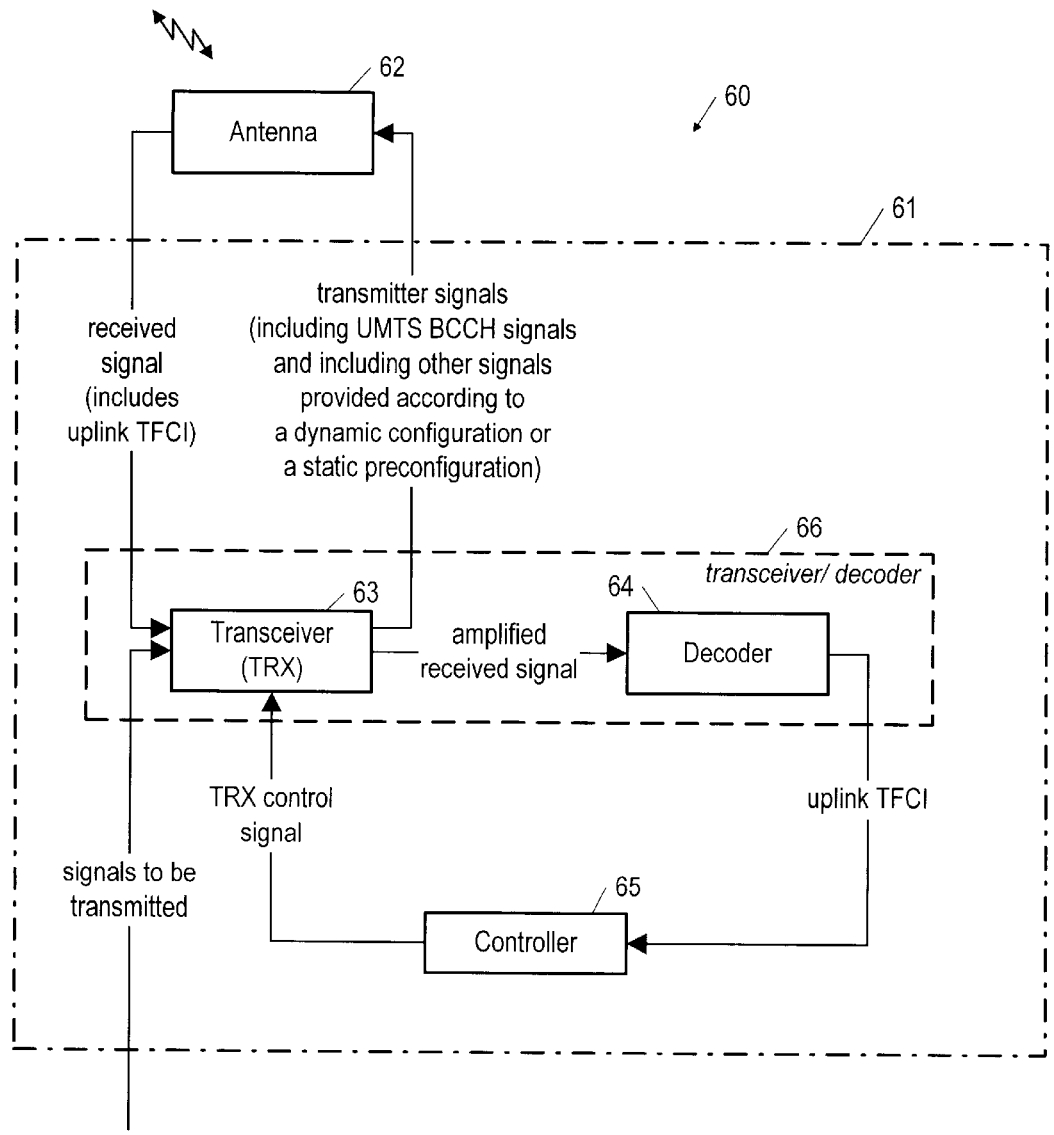
FIG. 6 is a schematic/block diagram of an apparatus according to the invention, serving as part of a base station, for determining how to communicate with a mobile station according to the method illustrated in FIG. 3.

Referring now to FIG. 6, the principal components of a base station 60 that are used in executing the method of the invention indicated in FIG. 3 are shown; the components that implement the invention are indicated collectively as apparatus 61. The apparatus 61 includes: an antenna 52 for transmitting and receiving signals to and from a plurality of mobile stations; a transceiver (TRX) module 63 for providing as transmitter signals the signals to be transmitted to the mobile stations, the transmitter signals including broadcast control signals (UMTS BCCH) and also other signals, and for receiving (RAT) signals from the mobile stations, the received signals including an uplink TFCI (which can indicate a dynamic configuration); a decoder 64 for decoding any received signal and so providing an uplink TFCI included in any received signal; and a controller 65. The controller is provided with the uplink TFCI from a mobile station by the decoder, and based on the uplink TFCI determines how to communicate with the mobile station, based on the steps indicated in FIG. 3. Note, the decision whether or not a base station (node B) is to use dynamic configurations at all is typically made by the Radio Network Controller (RNC) controlling the base station, not by the base station. As in the case of the receiver/decoder of the mobile station indicated in FIG. 5, the allocation of functions indicated in FIG. 6 between the transceiver 63 and the decoder 64 is also in some respects arbitrary, and the invention is more generally represented in terms of a combined transceiver/decoder module 66, as indicated in FIG. 6.

Discussion

The decoding of the UMTS BCCH signal to obtain the dynamic configuration parameters can be performed using any of the various known methods. The implementation of the CRC (i.e. how many bits are used for CRC) is a standards-specific issue. The RSSI can be determined by detecting the received RF signal level; the signal level is then converted to digital form by an A/D converter and provided to the controller/timer module (FIG. 4).

The reception of the UMTS BCCH transmission is preferably done, as mentioned above, between paging receptions. It is assumed that the controller/timer module is aware of the paging reception timing interval information, which depends on the telecommunication standard in use. The controller/timer module uses the paging reception information and the timer interval T_attempt to control the reception circuits of the device. In other words, the controller/timer module then controls the reception module so as to have it repeatedly try to read the dynamic configuration parameters, waiting a time interval T_attempt, set by the standard in use, between each attempt. A new attempt is of course only made if the previous attempt failed.

The timer interval T_attempt and the optional bit (provided over the GSM BCCH to indicate whether or not the node B to which the mobile station is being handed over uses dynamic configurations) would preferably be defined by a standard. The requirement for decoding dynamic configuration parameters in respect to the timer interval T_attempt (either its value, or how its value would be conveyed) should also be set out in a standard.

As mentioned above, it is advantageous to keep the mobile station power consumption as low as possible in general. Therefore, when dynamic configurations are transmitted on the UTRA BCCH, it is advantageous that these dynamic configurations be repeated in the system information of the UTRA BCCH often enough so that the UE need not continue to decode the UTRA BCCH for too long a time. In other words, the UE should not have to wait too long for the dynamic configurations to appear again. On the other hand, the UE should not attempt to decode the UTRA BCCH when UTRAN quality (coverage) is poor or if dynamic configurations are not used in the network. Unnecessary decoding of UTRA BCCH increases the idle mode activity of the UE and so increases power consumption.

Scope of the Invention

It is to be understood that the above-described arrangements are only illustrative of the application of the principles of the present invention. In particular, the invention in respect to how a UTRA cell being handed a mobile station determines whether or not to use dynamic configuration parameters in communicating with the mobile is of use not only in a handover from a GSM cell to a UTRA cell, but also from one UTRA cell to another, i.e. for internal UTRA cell handovers. In addition, it is clear that the invention also comprehends not only handovers from a GSM base station to a UTRA node B, but also a handing off from a base station of any other appropriate first wireless communication system to a base station of any second and different appropriate kind of wireless communication system. Numerous modifications and alternative arrangements may be devised by those skilled in the art without departing from the spirit and scope of the present invention, and the appended claims are intended to cover such modifications and arrangements.

What is claimed is:

1. A method for use by a mobile station in determining whether dynamic configurations are in use by a base station of a first wireless communication system to which the mobile station is being handed over by a base station of a different wireless communication system, the base station of the different wireless communication system broadcasting a control signal on a broadcast control channel, the base station of the first wireless communication system also broadcasting a control signal on a broadcast control channel, the method comprising:

a) a step (11) of determining whether the signal level of the control signal broadcast by the different wireless communication system meets a predetermined criterion for intersystem reselection;

b) a step (12) of receiving the control signal broadcast by the first wireless communication system;

c) a step (13) of performing an error check of the received control signal broadcast by the first wireless communication system; and d) a step (15) of decoding the control signal broadcast by the first wireless communication system and in so doing, reading whatever dynamic configurations are being broadcast by the base station of the first wireless communication system;

wherein, if the error check fails, the mobile station performs a step (14) of waiting a predetermined time interval (T_attempt), and then repeats the method beginning with the step (12) of receiving the control signal from the first wireless communication system.

2. The method of claim 1, further comprising a step (20) of decoding the control signal broadcast by the different wireless communication system and reading a flag bit indicating whether or not the base station of the first wireless communication system is using dynamic configurations, and wherein, only if the flag bit indicates that the base station of the first wireless communication system is using dynamic configurations does the mobile station carry out the aforementioned steps (a)–(d).

3. The method of claim 1, wherein the first wireless communication system is the universal mobile telephone system terrestrial radio access (UTRA) wireless communication system, and the base station of the first wireless communication system is a node B, and wherein the broadcast control channel of the first wireless communication system is the UTRA broadcast control channel (BCCH).

4. The method of claim 1, wherein the different wireless communication system is the global system for mobile communications (GSM) wireless communication system, and wherein the broadcast control channel of the different wireless communication system is the GSM broadcast control channel (BCCH).

5. A method for use by a base station of a first wireless communication system in determining whether or not to use dynamic configurations in communicating with a mobile station being handed over by a base station of a different wireless communication system, the communication consisting of uplink signals from the mobile station to the base station of the first wireless communication system and downlink signals from the base station of the first wireless communication system to the mobile station, the mobile station communicating with the base station of the first wireless communication according to a protocol in which a transport format combination indicator (TFCI) is used, the method comprising:

a) a step (32) of transmitting to and receiving from the mobile station using dynamic configuration parameters;

b) a step (34) of examining the uplink TFCI to determine whether the TFCI points to a dynamic configuration; and c) a step (35) of continuing to transmit to and receive from the mobile station with the dynamic configuration pointed to by the uplink TFCI, if the uplink TFCI points to a dynamic configuration, and otherwise a step (36) of transmitting to and receiving from the mobile station using a static preconfiguration.

6. The method of claim 5, wherein the first wireless communication system is the universal mobile telephone system terrestrial radio access (UTRA) wireless communication system, and the base station of the first wireless communication system is a node B.

7. The method of claim 5, wherein the different wireless communication system is the global system for mobile communications (GSM) wireless communication system.

8. An apparatus (51) for use by a mobile station (50) in determining whether dynamic configurations are in use by a base station (60) of a first wireless communication system to which the mobile station is being handed over by a base station of a different wireless communication system, the base station of the first wireless communication system broadcasting a broadcast control signal on a broadcast control channel, and the base station of the different wireless communication system broadcasting a different broadcast control signal on a different broadcast control channel, the apparatus comprising:

a) a receiver/decoder (56), responsive to signals received from the base station (60) to which the mobile station is being handed over including the broadcast control signal and the different broadcast control signal, responsive to a receiver control signal indicating that the receiver/decoder should receive the broadcast control signal, responsive to a decoder control signal indicating that the receiver/decoder should decode the received broadcast control signal and so read a dynamic configuration indicated by the broadcast control signal, for providing a signal level indicator (RSSI) indicating a signal level of the different broadcast control signal, and for providing an error check (CRC) for the broadcast control signal; and b) a controller/timer (55), responsive to the signal level indicator (RSSI) indicating a signal level of the different broadcast control signal, and the error check (CRC) for the broadcast control signal, for providing the receiver control signal indicating that the receiver/decoder should receive the broadcast control signal depending on whether or not the signal level indicator meets predetermined criteria, for providing the decoder control signal indicating that the receiver/decoder should decode the received broadcast control signal and so read a dynamic configuration indicated by the broadcast control signal depending on the error check (CRC) for the broadcast control signal, and for again providing the receiver control signal after each failed error check but only after a predetermined time interval (T_attempt).

9. The apparatus of claim 8, wherein the receiver/decoder (56) also provides a flag bit extracted from the different broadcast control signal, and wherein the controller/timer

(55) uses the flag bit in deciding whether to attempt to determine if dynamic configurations are in use by the base station of the first wireless communication system.

10. The apparatus of claim 8, wherein the first wireless communication system is the universal mobile telephone system terrestrial radio access (UTRA) wireless communication system, and the base station of the first wireless communication system is a node B, and wherein the broadcast control channel of the first wireless communication system is the UTRA broadcast control channel (BCCH).

11. The apparatus of claim 8, wherein the different wireless communication system is the global system for mobile communications (GSM) wireless communication system, and wherein the broadcast control channel of the different wireless communication system is the GSM broadcast control channel (BCCH).

12. An apparatus (61) for use by a base station (60) of a first wireless communication system in determining whether or not to use dynamic configurations in communicating with a mobile station being handed over by a base station of a different wireless communication system, the communication consisting of uplink signals from the mobile station to the base station of the first wireless communication system and downlink signals from the base station of the first wireless communication system to the mobile station, the mobile station communicating with the base station of the first wireless communication according to a protocol in which a transport format combination indicator (TFCI) is used, the apparatus comprising:
  a) a transceiver/decoder (56), responsive to a received signal issuing from the mobile station, responsive to signals to be transmitted including broadcast control signals (UMTS BCCH) and including other signals, and responsive to a transceiver control signal indicating whether signals are to be transmitted according to either a dynamic configuration or a static preconfiguration, for providing transmitter signals conveying the signals to be transmitted, wherein the signals other than the broadcast control signals are provided according to a dynamic configuration or a static preconfiguration depending on the transceiver control signal, and for providing an uplink transport format combination indicator (TFCI) extracted from the received signal issuing from the mobile station; and
  b) a controller (65), responsive to the uplink transport format combination indicator (TFCI), for providing the transceiver control signal, wherein the controller assigns a value to the transceiver control signal to indicate that the transceiver/decoder is to use a dynamic configuration in first communicating with the mobile station depending on whether or not the base station (60) uses a dynamic configuration, and then, if the base station uses a dynamic configuration, the controller (65) examines the uplink transport format combination indicator (TFCI) to determine whether or not it indicates a dynamic configuration, and if so, assigns a value to the transceiver control signal indicating that the transceiver/decoder is to continue communicating with the mobile station using a dynamic configuration.

13. The apparatus of claim 12, wherein the first wireless communication system is the universal mobile telephone system terrestrial radio access (UTRA) wireless communication system, and the base station of the first wireless communication system is a node B.

14. The apparatus of claim 12, wherein the different wireless communication system is the global system for mobile communications (GSM) wireless communication system.

15. A method, comprising the steps of:
  a) receiving (12 22) at a mobile station a broadcast control signal issuing from a base station to which the mobile station is being handed over by another base station, and
  b) based on an error check (13 23) of the broadcast control signal, either reading (15 25) any dynamic configuration indicated by the broadcast control signal or waiting (14 24) until a predetermined time to repeat the aforementioned step (a).

16. A method as in claim 15, wherein the steps (a)–(b) are performed only if a flag bit received from the base station handing over the mobile station indicates that dynamic configurations are in use at the base station to which the mobile station is being handed over.

17. A method, comprising the steps of:
  a) receiving (32) at a base station a signal (TFCI) from a mobile station indicating a dynamic configuration or a static preconfiguration in use by the mobile station, and
  b) using dynamic configuration parameters (35) or static preconfiguration parameters (36) in said base station depending on said signal received from said mobile station,
  wherein the base station is being handed over a mobile station by another base station, and further comprising the steps of:
  c) receiving (12 22) at the mobile station a broadcast control signal issuing from the base station to which the mobile station is being handed over, and
  d) based on an error check (13 23) of the broadcast control signal, either reading (15 25) any dynamic configuration indicated by the broadcast control signal or waiting (14 24) until a predetermined time to repeat the aforementioned step (c).

18. A method as in claim 17, wherein the steps (c)–(d) are performed only if a flag bit received from the base station handing over the mobile station indicates that dynamic configurations are in use at the base station to which the mobile station is being handed over.

19. An apparatus (51) for use by a mobile station, comprising:
  a) means (56) for receiving a broadcast control signal issuing from a base station to which the mobile station is being handed over by another base station and for performing an error check of the broadcast control signal; and
  b) means (55), responsive to the error check of the broadcast control signal, for either reading any dynamic configuration indicated by the broadcast control signal or waiting until a predetermined time and then activating the means for receiving the broadcast control signal, depending on the error check.

20. An apparatus (51) as in claim 19, wherein the means (56) for receiving a broadcast control signal and performing an error check also extracts a flag bit from a broadcast control signal issuing from the other base station, and wherein the mobile station attempts to read dynamic configurations only if the flag bit indicates dynamic configurations are in use by the base station to which the mobile station is being handed over.

21. A system, comprising an apparatus (61) for use by a base station being handed over a mobile station by another base station, the apparatus comprising:
  means (66) for receiving a signal (TFCI) from a mobile station indicating a dynamic configuration or a static preconfiguration in use by the mobile station; and means (65) for using dynamic configuration parameters or static preconfiguration parameters in said base station depending on said signal received from said mobile station;

and further comprising an apparatus (51) for use by the mobile station, the apparatus for use by the mobile station comprising:

means (56) for receiving a broadcast control signal issuing from the base station to which the mobile station is being handed over by the other base station and for performing an error check of the broadcast control signal; and means (55), responsive to the error check of the broadcast control signal, for either reading any dynamic configuration indicated by the broadcast control signal or waiting until a predetermined time and then activating the means for receiving the broadcast control signal, depending on the error check.

22. A system as in claim 21, wherein the means (56) for receiving a broadcast control signal and performing an error check also extracts a flag bit from a broadcast control signal issuing from the other base station, and wherein the mobile station attempts to read dynamic configurations only if the flag bit indicates dynamic configurations are in use by the base station to which the mobile station is being handed over.

* * * * *